US010443717B2

(12) United States Patent
Tohta

(10) Patent No.: US 10,443,717 B2
(45) Date of Patent: Oct. 15, 2019

(54) CONTROL METHOD AND CONTROL DEVICE FOR TRANSMISSION MECHANISM

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/067,636

(22) PCT Filed: Oct. 26, 2016

(86) PCT No.: PCT/JP2016/081679
§ 371 (c)(1),
(2) Date: Jul. 2, 2018

(87) PCT Pub. No.: WO2017/138194
PCT Pub. Date: Aug. 17, 2017

(65) Prior Publication Data
US 2019/0017594 A1 Jan. 17, 2019

(30) Foreign Application Priority Data
Feb. 10, 2016 (JP) ................................ 2016-023503

(51) Int. Cl.
*F16H 61/14* (2006.01)
*F16H 61/02* (2006.01)
(Continued)

(52) U.S. Cl.
CPC ........... *F16H 61/143* (2013.01); *B60K 6/547* (2013.01); *B60W 10/06* (2013.01); *B60W 10/11* (2013.01);
(Continued)

(58) Field of Classification Search
CPC ........ F16H 61/14; F16H 61/143; F16H 61/16; F16H 61/66; F16H 2061/163; B60W 20/30
See application file for complete search history.

(56) References Cited

U.S. PATENT DOCUMENTS 4,270,636 A * 6/1981 Sunohara ................ F16H 61/14 192/3.31
4,843,918 A * 7/1989 Morimoto ............. F16H 47/065 477/38
2009/0239705 A1* 9/2009 Tawara ................. F16H 61/143 477/38

FOREIGN PATENT DOCUMENTS

JP H11-30318 A 2/1999
JP 2003-90428 A 3/2003
(Continued)

*Primary Examiner* — Edwin A Young
(74) *Attorney, Agent, or Firm* — Global IP Counselors, LLP

(57) ABSTRACT

A vehicle includes an engine as a drive source and a continuously variable transmission. The continuously variable transmission includes a torque converter having a lockup clutch. When simultaneous execution of an upshift of the continuously variable transmission and a lockup engagement of the lockup clutch is required in accordance with an accelerator depression operation, the LU engagement control of the lockup clutch is started in accordance with an LU engagement request. On the other hand, the upshift control uses the continuously variable transmission to place the starting of the control with respect to the upshift request on standby and cancels the standby when the LU engagement control of the lockup clutch enters a lockup engagement completion region and starts the upshift control (delayed control).

6 Claims, 6 Drawing Sheets

(51) Int. Cl.

| | |
|---|---|
| ***F16H 61/66*** | (2006.01) |
| ***F16H 61/16*** | (2006.01) |
| ***F16H 61/662*** | (2006.01) |
| ***B60K 6/547*** | (2007.10) |
| ***B60W 10/06*** | (2006.01) |
| ***B60W 10/11*** | (2012.01) |
| ***B60W 20/30*** | (2016.01) |
| *F16H 59/14* | (2006.01) |
| *F16H 59/40* | (2006.01) |
| *F16H 63/50* | (2006.01) |

(52) U.S. Cl.

CPC ............ *B60W 20/30* (2013.01); *F16H 61/02* (2013.01); *F16H 61/0213* (2013.01); *F16H 61/14* (2013.01); *F16H 61/16* (2013.01); *F16H 61/66* (2013.01); *F16H 61/66259* (2013.01); *F16H 59/40* (2013.01); *F16H 63/502* (2013.01); *F16H 2059/144* (2013.01); *F16H 2061/0227* (2013.01)

(56) References Cited

FOREIGN PATENT DOCUMENTS

| | | | |
|---|---|---|---|
| JP | 2010-209982 | A | 9/2010 |
| JP | 2014-88895 | A | 5/2014 |

* cited by examiner

CONTROL METHOD AND CONTROL DEVICE FOR TRANSMISSION MECHANISM

CROSS-REFERENCE TO RELATED APPLICATIONS

This application is a U.S. national stage application of International Application No. PCT/JP2016/081679, filed on Oct. 26, 2016, which claims priority to Japanese Patent Application No. 2016-023503, filed on Feb. 10, 2016. The entire contents disclosed in Japanese Patent Application No. 2016-023503 is hereby incorporated herein by reference.

BACKGROUND

Field of the Invention

The present invention relates to a control method and a control device for a transmission mechanism to be used in a travel scenario in which the simultaneous execution of lockup engagement and upshifting is required.

Background Information

The invention is applied to a vehicle in which a torque converter having a lockup clutch is provided between an engine and a continuously variable transmission. A lockup control method is known in which lockup engagement is carried out when the vehicle starts to move while in a state in which a lockup clutch is disengaged and the vehicle enters a lockup region from a converter region (for example, refer to Japanese Laid-Open Patent Application No. 2003-90428—Patent Document 1).

SUMMARY

There is a method for setting a shift map of a continuously variable transmission, in which the coasting transmission ratio when the driver's foot is off the accelerator pedal (accelerator position opening amount APO=0/8) is set on the lower side of the driving transmission ratio at the time of a low accelerator position opening amount (accelerator position opening amount APO=1/8).

In a vehicle in which the above-described shift map is set, it will be assumed that after the vehicle has started to move and after the driver's foot is off the accelerator pedal while in a converter region in which the lockup clutch is disengaged, that the accelerator pedal is again depressed. At this time, according to the prior art, when the vehicle speed increases and enters the lockup region, if the accelerator position opening amount, after the accelerator pedal is depressed, is the above-described low accelerator position opening amount, at the same time that the lockup engagement control is started, an upshift control via the accelerator depression operation will be started.

In a travel scenario in which simultaneous execution of lockup engagement (including lockup re-engagement) and upshifting is required due to an accelerator depression operation in this manner, the following problems occur.

That is, whereas the engine rotational speed is increased due to the accelerator depression operation, the turbine rotational speed is decreased by the upshift control; therefore, the differential rotational speed of the lockup clutch increases during lockup engagement control. Consequently, it becomes necessary to wait until the differential rotational speed is again low, which thereby increases the time required for the lockup engagement to be completed.

In view of the problems described above, an object of the present invention is to provide a control method and a control device for a transmission mechanism with which the time required for lockup engagement to be completed is reduced, in travel scenarios in which simultaneous execution of lockup engagement and upshifting is required.

In order to realize the object described above, a transmission mechanism to which the present invention is applied comprises a torque converter having a lockup clutch. In the control method for a transmission mechanism, when simultaneous execution of the upshifting of the transmission mechanism is required at the same time as the starting of the lockup engagement of the lockup clutch, the starting of the upshift control by the transmission mechanism is delayed until after a lockup engagement of the lockup clutch in a lockup engagement control is completed.

Accordingly, when the execution of an upshift of the transmission mechanism is required at the same time as the starting of lockup engagement, in accordance with an accelerator depression operation, the starting of the upshift control by the transmission mechanism is delayed until the lockup engagement control enters a lockup engagement completion region. That is, while the drive source rotational speed increases due to an accelerator depression operation, by delaying the upshift, the turbine rotational speed (=input rotational speed of the transmission mechanism) does not decrease. It is thus possible to suppress an increase in the differential rotational speed of the lockup clutch during lockup engagement control, and to prevent an increase in the time that is required for the lockup engagement to be completed. As a result, it is possible to reduce the time required for lockup engagement to be completed, in a travel scenario in which simultaneous execution of lockup engagement and upshifting is required.

DETAILED DESCRIPTION OF THE EMBODIMENTS

Figure 1:
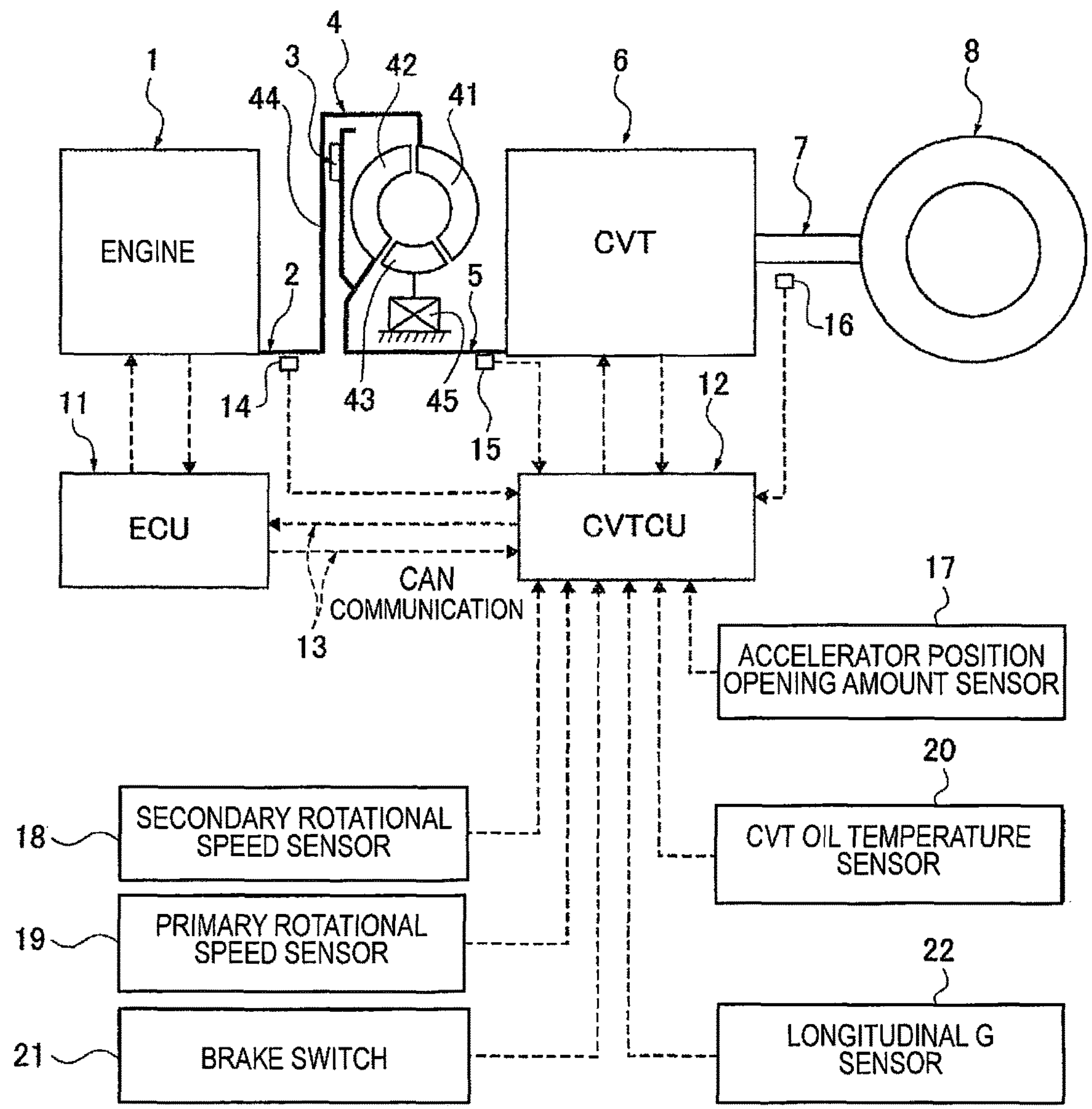
FIG. 1 is an overall system view illustrating the overall configuration of an engine-equipped vehicle which contains a continuously variable transmission provided with a torque converter having a lockup clutch, to which is applied the control method and control device according to a first embodiment.

A preferred embodiment for realizing the control method and control device for a transmission mechanism of the present invention will be described below on the basis of a first embodiment and a second embodiment illustrated in the drawings.

First Embodiment

The configuration is described first. The control method and control device according to the first embodiment are applied to an engine-equipped vehicle in which is mounted a continuously variable transmission provided with a torque converter having a lockup clutch as a transmission mechanism. The "overall system configuration" and the "configuration of the cooperative control process between the lockup engagement control and the upshift control" will be described separately regarding the configurations of the control device for a transmission mechanism of the first embodiment.

Overall System Configuration

Figure 2:
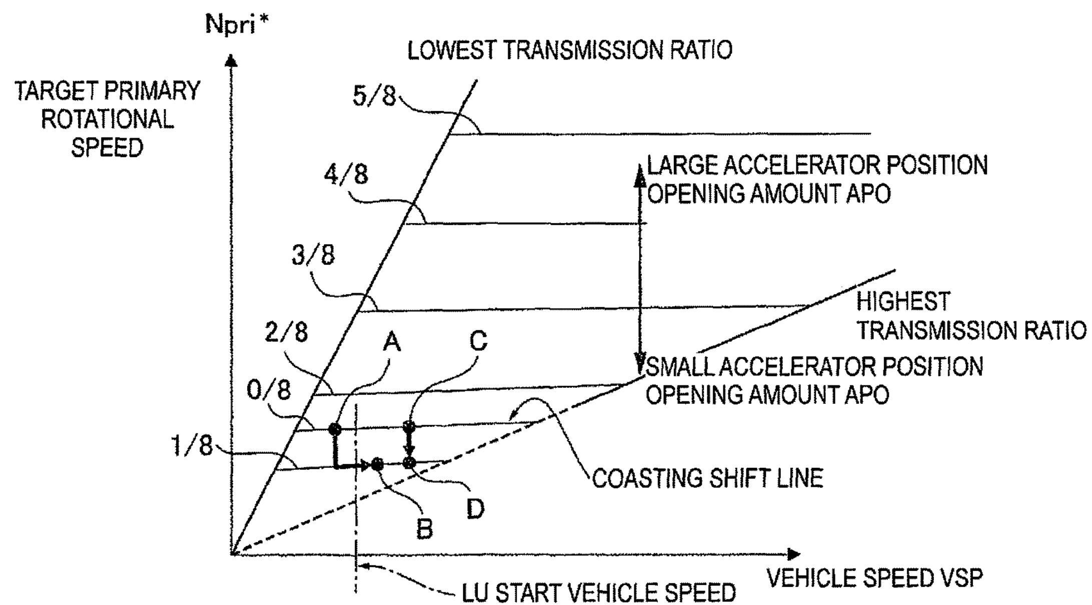
FIG. 2 is a D range shift map illustrating one example of a shift map in which is drawn a shift line for determining the target primary rotational speed of the continuously variable transmission using the operating point.
Figure 3:
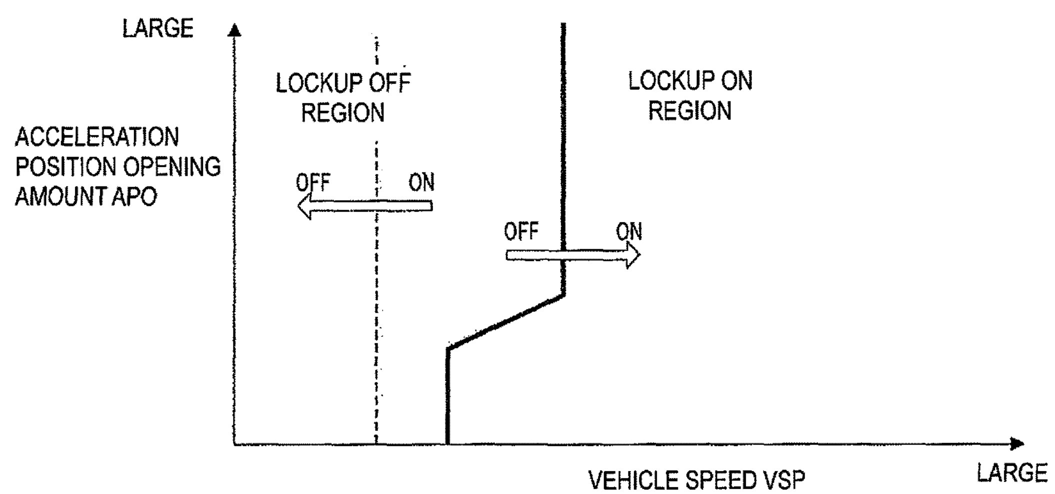
FIG. 3 is a D range LU schedule illustrating one example of an LU schedule in which are drawn a smooth LU engagement line and a smooth LU disengagement line of the lockup clutch.

FIG. 1 shows the overall configuration of an engine-equipped vehicle in which is mounted a continuously variable transmission provided with a torque converter having a lockup clutch, to which is applied the control method and control device according to the first embodiment; FIG. 2 shows a D range shift map of a continuously variable transmission; and FIG. 3 shows a D range LU map. The overall system configuration will be described below based on FIGS. 1 to 3. "LU" is an acronym for "lockup."

The vehicle drive system comprises an engine 1, an engine output shaft 2, a lockup clutch 3, a torque converter 4, a transmission input shaft 5, a continuously variable transmission 6 (transmission), a drive shaft 7, and drive wheels 8, as illustrated in FIG. 1.

The lockup clutch 3 is built into the torque converter 4, couples the engine 1 and the continuously variable transmission 6 via the torque converter 4 by releasing the clutch, and directly connects the engine output shaft 2 and the transmission input shaft 5 by engaging the clutch. The engagement/slip engagement/disengagement of the lockup clutch 3 is controlled by LU differential pressure that is regulated on the basis of line pressure, which is the source pressure, when an LU command pressure is output from a CVT control unit 12, described below. Line pressure is produced by regulating, with a line pressure solenoid valve, the pressure of discharge oil from an oil pump, which is not shown, that is rotationally driven by the engine 1.

The torque converter 4 comprises a pump impeller 41, a turbine runner 42 that is disposed opposite to the pump impeller 41, and a stator 43 that is disposed between the pump impeller 41 and the turbine runner 42. The torque converter 4 is a fluid coupling that transmits torque by using the circulation of hydraulic oil filled therein to each blade of the pump impeller 41, the turbine runner 42, and the stator 43. The pump impeller 41 is coupled to the engine output shaft 2 via a converter cover 44, the inner surface of which is the engagement surface of the lockup clutch 3. The turbine runner 42 is coupled to the transmission input shaft 5. The stator 43 is provided to a stationary member (transmission case, etc.) via a one-way clutch 45.

The continuously variable transmission 6 is a belt-type continuously variable transmission that steplessly controls the transmission ratio by changing the belt contact diameter between a primary pulley and a secondary pulley, and the output rotation after shifting is transmitted to the drive wheels 8 via a drive shaft 7.

The vehicle control system comprises an engine control unit 11 (ECU), a CVT control unit 12 (CVTCU), and a CAN communication line 13, as illustrated in FIG. 1. An engine rotational speed sensor 14, a turbine rotational speed sensor 15 (=CVT input rotational speed sensor), and a CVT output rotational speed sensor 16 (=vehicle speed sensor) are provided as sensors for obtaining input information. Also provided are an accelerator position opening amount sensor 17, a secondary rotational speed sensor 18, a primary rotational speed sensor 19, CVT oil pressure sensor 20, a brake switch 21, a longitudinal G sensor 22, etc.

The engine control unit 11 carries out a fuel cut control at the time of coasting with the driver's foot off the accelerator pedal, an idle stop control when the vehicle is stopped, and the like. The engine control unit then carries out a cooperative control with the CVT control unit 12 via the CAN communication line 13. For example, when a torque reduction signal requesting the start of an engine torque reduction control is received from the CVT control unit 12 via the CAN communication line 13, the amount of fuel injected into the engine 1 is reduced so as to produce a torque reduction value that is based on the accelerator position opening amount APO. Then, during the execution of the engine torque reduction control, once the torque reduction signal received from the CVT control unit 12 via the CAN communication line 13 ceases, a fuel injection control for producing a torque corresponding to the driver's request is restored.

The CVT control unit 12 carries out a transmission control for controlling the transmission ratio of the continuously variable transmission 6, a line pressure control, a lockup control for controlling the engagement/slip engagement/disengagement of the lockup clutch 3, etc.

The shifting of the continuously variable transmission 6 is controlled using an operating point (VSP, APO) and the D range shift map shown in FIG. 2. That is, when the operating point (VSP, APO) moves, a target primary rotational speed Npri*, which is calculated on the basis of the D range shift map, is changed from a primary rotational speed Npri before the movement, and either an upshift or downshift shift request is output. When this shift request is output, a shift control for steplessly changing the transmission ratio is carried out by using feedback control to match the primary rotational speed Npri of the continuously variable transmission 6 to a new target primary rotational speed Npri*. Of the shift controls, the upshift control due to an upshift request is a control for reducing the primary rotational speed Npri of the continuously variable transmission 6 (=turbine rotational speed Nt of the torque converter 4). The downshift control due to a downshift request, on the other hand, is a control for increasing the primary rotational speed Npri of the continuously variable transmission 6 (=turbine rotational speed Nt of the torque converter 4).

Here, a "D range shift map" has a shift line for each accelerator position opening amount APO that determines the target primary rotational speed Npri* on the basis of an operating point (VSP, APO) defined by the vehicle speed VSP and the accelerator position opening amount APO, as illustrated in FIG. 2. Of the shift lines in the D range shift map, the shift line representing a coasting state with the driver's foot off the accelerator pedal (when the accelerator position opening amount APO is an opening amount of 0/8) is referred to as the "coasting shift line," and the shift line representing a driving state with the driver's foot on the accelerator (when the accelerator position opening amount APO is an opening amount of 1/8-8/8) is referred to as the "driving shift line."

In the case of the "D range shift map" of the first embodiment, the coasting shift line when the accelerator position opening amount APO is 0/8 is set to a higher position, where the target primary rotational speed Npri* is higher, than the driving shift line where the accelerator position opening amount APO is the low accelerator position opening amount of 1/8. In other words, the coasting transmission ratio defined by the coasting shift line, when the accelerator position opening amount APO is an opening amount of 0/8, is set to be on a low gear ratio side that makes the primary rotational speed Npri higher than the driving transmission ratio defined by the driving shift line when the accelerator position opening amount APO is 1/8. Regarding the driving shift line when the accelerator position opening amount APO is greater than or equal to 1/8, the primary rotational speed Npri relative to the vehicle speed VSP is set in consideration to fuel consumption.

The reason for setting the coasting shift line to a higher position than the driving shift line when the accelerator position opening amount APO is 1/8 will now be described. If only fuel consumption were considered, the coasting shift line when the accelerator position opening amount APO is 0/8 would be lower than the driving shift line when the accelerator position opening amount APO is 1/8, but such a setting would cause the following problem.

That is, in a coasting state in which the driver's foot is off the accelerator pedal and the accelerator position opening amount APO is 0/8, a coast lockup control is carried out accompanying a fuel cut of the engine 1. Consequently, if the coasting shift line is set to a primary rotational speed Npri in consideration of fuel consumption, there is the risk that the lockup cannot be released in time if sudden braking occurs from a coasting travel state, leading to the stalling of the engine, i.e., the cessation of engine rotation. Therefore, with respect to the coasting shift line, the primary rotational speed Npri is set to the relatively high-speed rotation side such that a lockup can be released in time. For example, when the driving shift line when the accelerator position opening amount APO is 1/8 is Npri=1000 rpm, the primary rotational speed Npri on the coasting shift line when the accelerator position opening amount APO is an opening amount of 0/8 is set to Npri=1200 rpm.

The smooth lockup control of the lockup clutch 3 is basically carried out by using an operating point (VSP, APO) and the smooth LU schedule shown in FIG. 3 and determining LU engagement/LU disengagement from the operating point (VSP, APO) on the smooth LU schedule. The smooth LU schedule includes a smooth LU engagement line (solid line: for example, about 20 km/h) and a smooth LU disengagement line (broken line: for example, about 10 km/h), as illustrated in FIG. 3. In a smooth lockup control, an engagement command is output when the operating point (VSP, APO) crosses the smooth LU engagement line from the lockup OFF region (=non-LU region) and enters the lockup ON region (=LU region). Then, a disengagement command is output when the operating point (VSP, APO) crosses the smooth LU disengagement line from the lockup ON region and enters the lockup OFF region.

Of the smooth lockup controls of the lockup clutch 3, the coast lockup control in a coasting state with the driver's foot off the accelerator pedal is carried out on an exceptional basis without using the smooth LU schedule shown in FIG. 3. That is, if a fuel cut for cutting off the supply of fuel to the engine 1 is being carried out in accordance with a coasting state with the driver's foot off the accelerator pedal, an LU engagement command is output to engage the lockup clutch 3 on the basis of the execution of the fuel cut. On the other hand, if a coast lockup condition is not satisfied, such as when the vehicle is in a coasting state with the driver's foot off the accelerator pedal but the fuel cut is not carried out, an LU disengagement command is output to disengage the lockup clutch 3.

Figure 4:
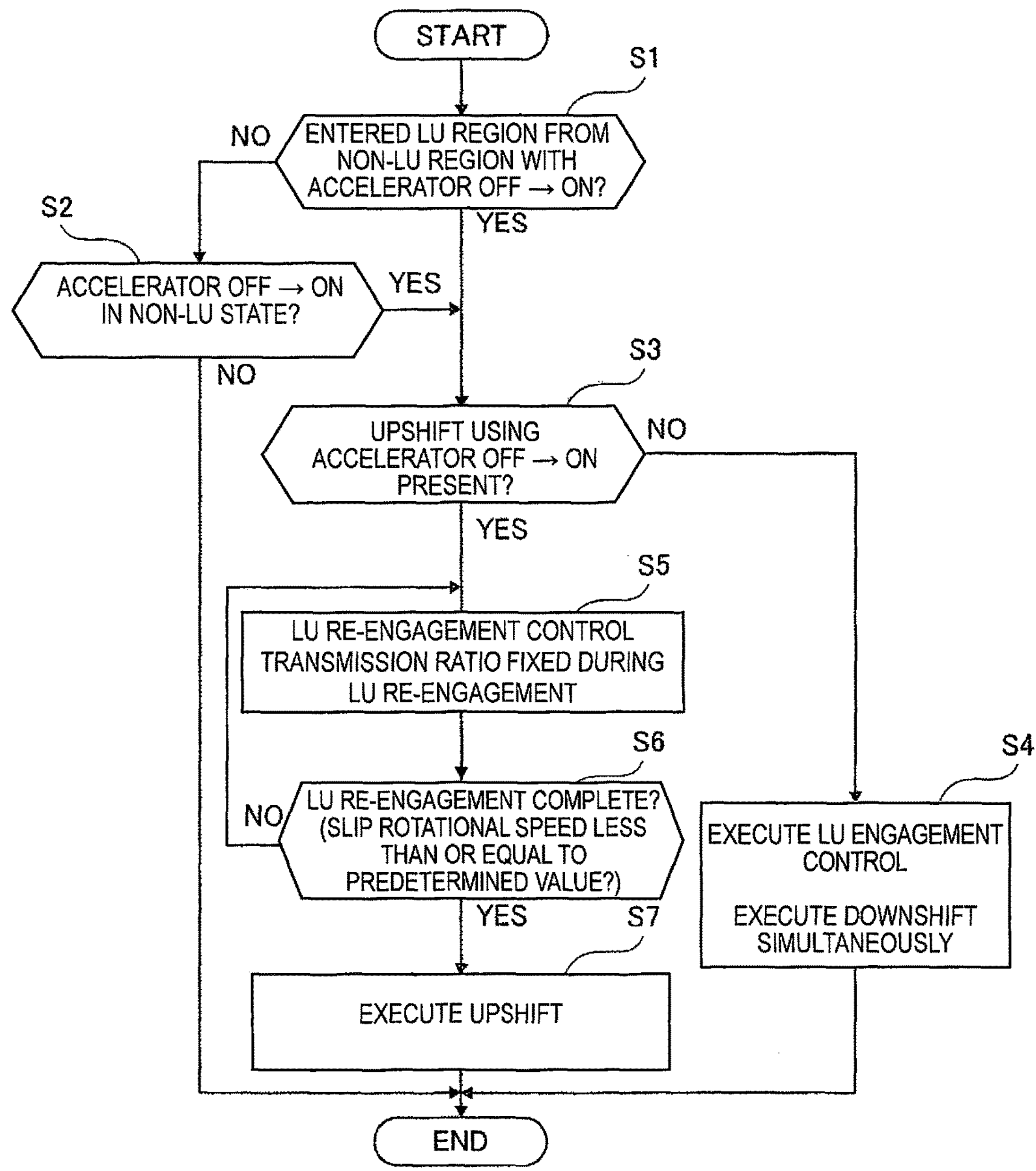
FIG. 4 is a flowchart illustrating the flow of a cooperative control process between lockup engagement control and upshift control, which are executed in a CVT control unit of the first embodiment, in a re-acceleration scenario that occurs due to an accelerator depression operation from a coasting state in which the driver's foot is off the accelerator pedal while the vehicle is in a lockup disengaged state.

Configuration of the Cooperative Control Process Between the Lockup Engagement Control and the Upshift Control FIG. 4 illustrates the flow of a cooperative control process between a lockup engagement control and an upshift control, which are executed in a CVT control unit 12 of the first embodiment, in a re-acceleration scenario that occurs due to an accelerator depression operation from a coasting state in which the driver's foot is off the accelerator pedal while in an LU disengaged state. Each step in FIG. 4 representing the configuration of the cooperative control process between the lockup engagement control and the upshift control will be described below. This process is started when the lockup clutch 3 is in a disengaged state due to the vehicle being in a coasting state with the driver's foot off the accelerator pedal but the coast lockup condition not being satisfied, and the lockup OFF condition and the accelerator OFF condition are both satisfied.

In Step S1, it is determined whether or not the operating point (VSP, APO) has entered an LU region from a non-LU region by carrying out an accelerator depression operation with the intention to re-accelerate from a coasting state while in the non-LU region. If YES (has entered the LU region by accelerator OFF→ON), the process proceeds to Step S3, and if NO (case other than entering LU region by accelerator OFF→ON), the process proceeds to Step S2. That is, in Step S1, YES is determined if an accelerator depression operation is carried out when the operating point (VSP, APO) is present in a non-LU region, and the operating point (VSP, APO) moves from the non-LU region to an LU region.

Here, the determination that an accelerator depression operation has been carried out is determined, for example, when the accelerator position opening amount APO from the accelerator position opening amount sensor 17 transitions from an opening amount of 0/8 (driver's foot off of the accelerator pedal) to an opening amount that is higher than 0/8. In addition, it is determined that the operating point (VSP, APO) has entered an LU region from a non-LU region when, using the smooth LU engagement line in the smooth LU schedule shown in FIG. 3, the operating point (VSP, APO) crosses the smooth LU engagement line due to an accelerator depression operation.

In Step S2, following the determination that it is a case other than an entering of the LU region by accelerator OFF→ON in Step S1, it is determined whether or not an accelerator depression operation has been carried out with the intention to re-accelerate from a coasting state while in the LU region. If YES (accelerator OFF→ON in the LU region), the process proceeds to Step S3, and if NO (other than accelerator OFF→ON in the LU region), the process proceeds to END. That is, in Step S2, YES is determined if an accelerator depression operation is carried out while the operating point (VSP, APO) remains in the LU region.

In Step S3, following the determination that the operating point has entered the LU region by accelerator OFF→ON in Step S1, or, the determination of accelerator OFF→ON in the LU region in Step S2, it is determined whether or not there is an upshift request due to an accelerator depression operation from a state in which the foot is away from the accelerator. If YES (upshift request due to accelerator OFF→ON present), the process proceeds to Step S5, and if NO (downshift request due to accelerator OFF→ON present), the process proceeds to Step S4.

Here, YES is determined in Step S3 for:

(a) a re-acceleration scenario in which an accelerator depression operation is carried out from an accelerator position opening amount APO of 0/8 to 1/8 when the operating point (VSP, APO) is in a non-LU region, and the operating point (VSP, APO) moves from point A in FIG. 2 (non-LU region) to point B in FIG. 2 (LU region).

(b) a re-acceleration scenario in which an accelerator depression operation is carried out from an accelerator position opening amount APO of 0/8 to 1/8 when the operating point (VSP, APO) remains in an LU region, and the operating point (VSP, APO) moves from point C (LU region) to point D (LU region) in FIG. 2. In the re-acceleration scenarios of (a) and (b), as is clear from FIG. 2, an upshift request for reducing the target primary rotational speed Npri* is output.

On the other hand, NO is determined in Step S3 for a re-acceleration scenario other than (a) or (b), such as when an accelerator depression operation is carried out from an accelerator position opening amount APO of 0/8 to 2/8-8/8. In this case, as is clear from FIG. 2, a downshift request for increasing the target primary rotational speed Npri* is output.

In Step S4, following the determination that a downshift request due to accelerator OFF→ON is present in Step S3, a downshift control of the continuously variable transmission 6 is carried out in accordance with the downshift request at the same time that an LU engagement control is carried out in accordance with an engagement request of the lockup clutch 3, and the process proceeds to END.

Next, the reason for carrying out the controls independently in accordance with each request when a simultaneous request occurs in which an engagement request of the lockup clutch 3 and a downshift request overlap will now be explained. This is due to the fact that when a downshift control of the continuously variable transmission 6 is carried out, the primary rotational speed Npri, which is the transmission rotational input speed increases, and the turbine rotational speed Nt of the torque converter 4 increases. Therefore, when an LU engagement control is carried out, the differential rotational speed of the torque converter 4, which is the difference between the engine rotational speed Ne and the turbine rotational speed Nt, is reduced by executing a downshift control, and it becomes possible to complete the engagement of the lockup clutch 3 (Ne=Nt) in a short period of time.

In Step S5, following a determination that an upshift request due to accelerator OFF→ON is present in Step S3, or, the determination that the LU engagement is incomplete in Step S6, execution of an LU engagement control is carried out in accordance with an engagement request of the lockup clutch 3, but the transmission ratio of the continuously variable transmission 6 is kept fixed during the LU engagement, and the process proceeds to Step S6.

Here, the "execution of an LU engagement control" is carried out by raising the LU command pressure to the initial command pressure, and then increasing the pressure from the initial command pressure by using a ramp command pressure which has a predetermined ramp gradient angle. "Fixing the transmission ratio of the continuously variable transmission 6" is realized by delaying the control start timing so as to delay the starting of the upshift control while the LU is engaged, when an upshift request is output.

In Step S6, following the LU engagement control and the fixing of the transmission ratio in Step S5, it is determined whether or not the LU engagement has been completed. If YES (LU engagement complete), the process proceeds to Step S7, and if NO (LU engagement incomplete), the process returns to Step S5.

Here, the "determination of completion of LU engagement" is made when the slip rotational speed, which is the differential rotational speed of the lockup clutch 3 (=engine rotational speed Ne−turbine rotational speed Nt) becomes less than or equal to a predetermined value (for example, an engagement completion threshold of about 10 rpm). When it is determined that LU engagement is complete, the LU command pressure is raised to a complete engagement command pressure.

In Step S7, following the determination that LU engagement is complete in Step S6, an upshift control of the continuously variable transmission 6, the transmission ratio of which was fixed, is started to carry out an upshift corresponding to the upshift request, and the process proceeds to END.

The actions are described next. The "action of the cooperative control process between the lockup engagement control and the upshift control," the "action of the cooperative control in a re-acceleration scenario from an LU disengaged state," and the "characteristic action in the cooperative control" will be described separately, regarding the control actions of the transmission mechanism of the first embodiment.

Action of the Cooperative Control Process Between the Lockup Engagement Control and the Upshift Control There are the following two re-acceleration scenarios which are subject to a cooperative control process. (a) A re-acceleration scenario in which, while coasting in a non-LU region due to an accelerator pedal release operation immediately after the vehicle begins to move, the vehicle speed VSP is increased due to another accelerator depression operation (0/8 opening amount→1/8 opening amount), thereby entering an LU region, and an LU engagement request is output (arrow between point A→point B in FIG. 2). (b) A re-acceleration scenario in which, while coasting in an LU region but in a non-LU state, with the lockup clutch 3 disengaged by an accelerator pedal release operation during travel, an LU engagement request is output due to another accelerator depression operation (0/8 opening amount→1/8 opening amount) (arrow between point C→point D in FIG. 2). Here, target scenario (b) is described in detail. During travel in the LU region, the accelerator pedal is depressed, the LU temporarily disengages, and acceleration is carried out by amplification of the torque by the torque converter 4. When re-engaging the lockup clutch 3 after acceleration, immediately before re-engagement the driver's foot is removed from the accelerator pedal, the engine rotational speed decreases, and the differential rotational speed increases. In order to suppress the occurrence of shock due to the LU being engaged in a state in which the differential rotation remains large, a control to cancel the re-engagement and to completely disengage the lockup clutch 3 is carried out. Then, the complete disengagement of the LU is maintained until the accelerator pedal is depressed again. This scenario is one in which the LU engagement is started by depressing the accelerator pedal (0/8 opening amount→1/8 opening amount) in this state.

In a re-acceleration scenario from a coasting state, in which an accelerator depression operation is carried out where the accelerator position opening amount APO is greater than or equal to an opening amount of 2/8, the process proceeds from Step S1→Step S3→Step S4→END in the flowchart of FIG. 4. Alternatively, the process proceeds from Step S1→Step S2→Step S3→Step S4→END.

That is, although this scenario is a re-acceleration scenario from a coasting state, an accelerator depression operation in which the accelerator position opening amount APO is greater than or equal to 2/8, rather than 1/8, is carried out, so that it is determined in Step S3 that a downshift request due to accelerator OFF→ON is present. In the subsequent Step S4, a downshift control of the continuously variable transmission 6 is carried out in accordance with a downshift request at the same time that an LU engagement control is carried out in accordance with an LU engagement request of the lockup clutch 3.

For re-acceleration scenario (a), if an accelerator depression operation in which the accelerator position opening amount APO is up to an opening amount of 1/8 is carried out, the process proceeds from Step S1→Step S3→Step S5→Step S6 in the flowchart of FIG. 4. Then, during the determination in Step S6 that LU engagement is incomplete, the flow from Step S5→Step S6 is repeated. Thereafter, if it is determined that LU engagement is complete in Step S6, the process proceeds from Step S6 to Step S7→END.

For re-acceleration scenario (b), if an accelerator depression operation in which the accelerator position opening amount APO is up to an opening amount of 1/8 is carried out, the process proceeds from Step S1→Step S2→Step S3→Step S5→Step S6 in the flowchart of FIG. 4. Then, during the determination in Step S6 that LU engagement is incomplete, the flow from Step S5→Step S6 is repeated. Thereafter, if it is determined that LU engagement is complete in Step S6, the process proceeds from Step S6 to Step S7→END.

That is, in both of the re-acceleration scenarios (a) and (b), due to an accelerator depression operation in which the accelerator position opening amount APO is up to an opening amount of 1/8 being carried out, it is determined in Step S3 that an upshift request due to accelerator OFF→ON is present. In the subsequent Step S5, an LU engagement control is carried out in accordance with an engagement request of the lockup clutch 3, but the transmission ratio of the continuously variable transmission 6 is kept fixed during the LU engagement. Thereafter, if it is determined that LU engagement is complete in Step S6, the process proceeds from Step S6 to Step S7→END. In Step S7, an upshift control of the continuously variable transmission 6, the transmission ratio of which was fixed, is started to carry out an upshift corresponding to the upshift request.

In this manner, for a re-acceleration scenario in which, from a coasting state, an accelerator depression operation is carried out in which the accelerator position opening amount APO is greater than or equal to an opening amount of 2/8, when a downshift request is output, an LU engagement control and a downshift control are carried out simultaneously by using independent control. On the other hand, for re-acceleration scenarios (a) and (b) in which, from a coasting state, an accelerator depression operation is carried out in which the accelerator position opening amount APO is up to an opening amount of 1/8, when an upshift request is output, the start timing of the upshift control is delayed by using cooperative control.

Action of the Cooperative Control in a Re-Acceleration Scenario From an LU Disengaged State A comparative example is assumed in which, when there is an upshift request of the continuously variable transmission at the same time as an engagement request of the lockup clutch, due to an accelerator depression operation from a coasting state in an LU disengaged state, the LU engagement control and the upshift control are independently controlled. The action of the independent control in the comparative example will be described below, on the basis of the time chart shown in FIG. 5.

When an accelerator depression operation from 0/8 opening amount to 1/8 opening amount is carried out at time t1, an LU engagement control and an upshift control are started simultaneously in accordance with an LU engagement request and an upshift request at time t1. Accordingly, the engine rotational speed Ne, which is the idling rotational speed in a coasting state up to time t1, increases from time t1 to time t3 in accordance with the accelerator depression operation. Then, when a clutch load is applied due to an increase in the LU capacity until time t5 due to the LU engagement control of the lockup clutch 3, the engine rotational speed Ne decreases from time t3 to time t5.

Figure 5:
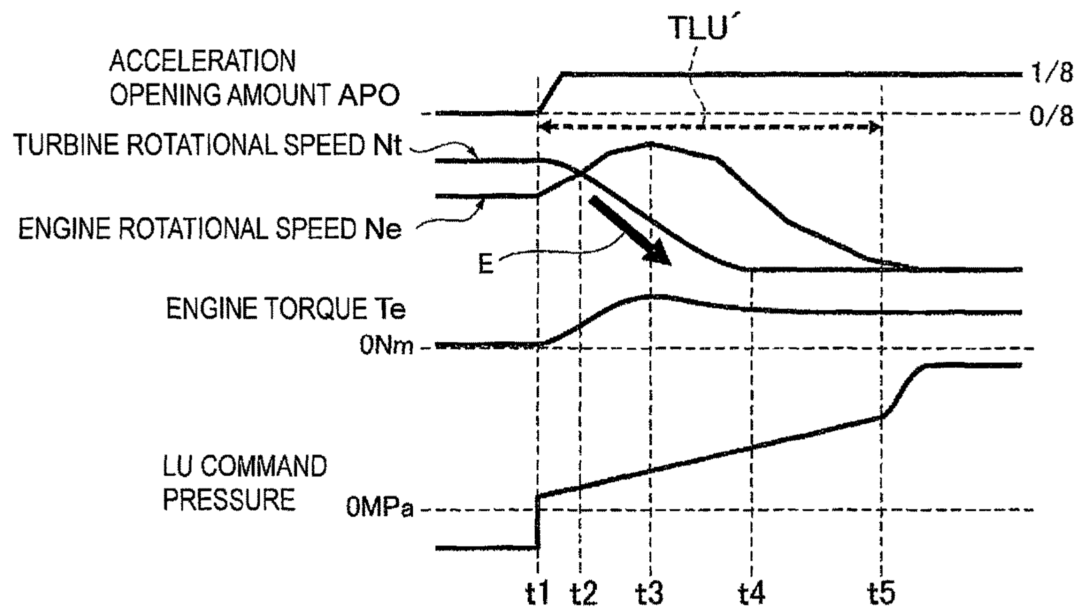
FIG. 5 is a time chart illustrating the respective characteristics of the accelerator position opening amount APO/engine rotational speed Ne/turbine rotational speed Nt/engine torque Te/LU command pressure, when independent control in a comparative example is executed in a re-acceleration scenario that occurs due to an accelerator depression operation from a coasting state in which the driver's foot is off the accelerator pedal while in a lockup disengaged state.

On the other hand, the turbine rotational speed Nt, which is higher than the engine rotational speed Ne due to the rotation of the turbine by the drive wheels 8 in a coasting state up to time t1, decreases from time t1 to time t4 due to the starting of the upshift control from time t1, as indicated by arrow E in FIG. 5. Accordingly, whereas the turbine rotational speed Nt>engine rotational speed Ne from time t1 to time t2, the relationship changes to the engine rotational speed Ne>turbine rotational speed Nt at time t2. Then, from time t2, due to an increase in the engine rotational speed Ne and a decrease in the turbine rotational speed Nt, the differential rotational speed (=Ne−Nt) increases up to time t4; the differential rotational speed then decreases from time t4 to time t5, and the differential rotational speed (slip rotational speed) reaches a very small value at time t5, at which point the LU engagement is completed.

In this manner, in the comparative example an LU engagement control and an upshift control are started simultaneously in accordance with an LU engagement request and an upshift request at time t1. Accordingly, whereas the engine rotational speed Ne increases due to an accelerator depression operation at time t1, the turbine rotational speed Nt decreases due to an upshift control from time t1. Consequently, the differential rotational speed of the lockup clutch (=Ne−Nt) increases during the LU engagement control, and it becomes necessary to wait until time t5 at which point the differential rotational speed becomes small; therefore, the time TLU' that is required for the lockup engagement to be completed (time t1-time t5) increases.

In contrast, in the first embodiment, when there is an upshift request of the continuously variable transmission 6 at the same time as an engagement request of the lockup clutch 3, due to an accelerator depression operation from a coasting state while in an LU disengaged state, the LU engagement control and the upshift control are cooperatively controlled. The action of the cooperative control in the first embodiment will be described below, on the basis of the time chart shown in FIG. 6.

When an accelerator depression operation from an opening amount of 0/8 to an opening amount of 1/8 is carried out at time t1 with respect to an LU engagement request and an upshift request at time t1, an LU engagement control is started from time t1, but the starting of the upshift control is delayed until time t4, at which point the LU engagement is determined to have been completed. Accordingly, the engine rotational speed Ne, which is the idling rotational speed in a coasting state up to time t1, increases from time t1 to time t3 in accordance with the accelerator depression operation. Then, when a clutch load is applied, the engine rotational speed Ne decreases from time t3 to time t4, due to the LU capacity increasing due to the LU engagement control of the lockup clutch 3.

Figure 6:
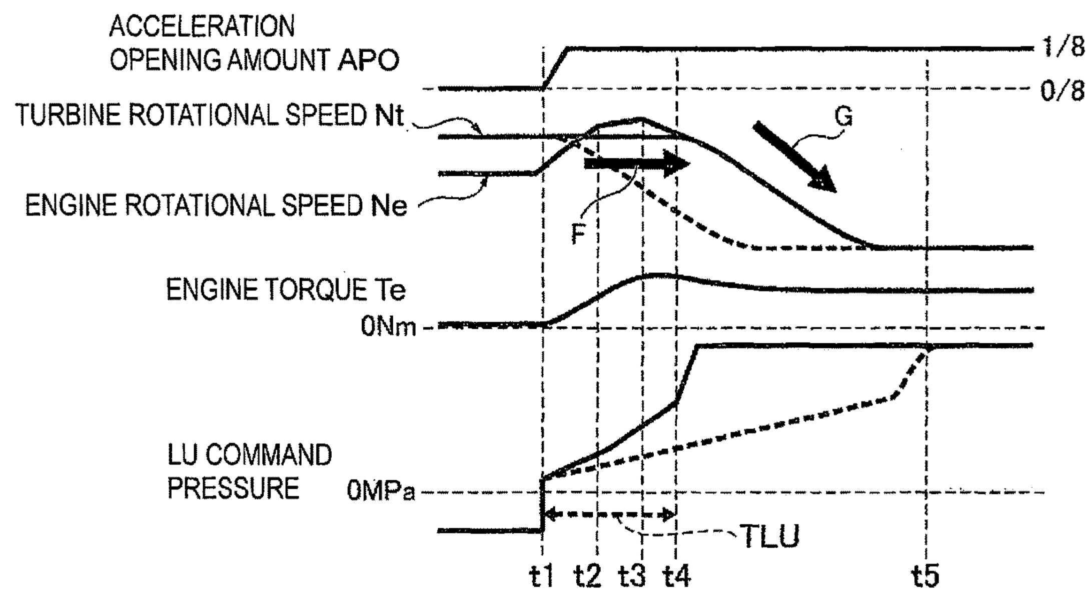
FIG. 6 is a time chart illustrating the respective characteristics of the accelerator position opening amount APO/engine rotational speed Ne/turbine rotational speed Nt/engine torque Te/LU command pressure, when a cooperative control of the first embodiment is executed in a re-acceleration scenario that occurs due to an accelerator depression operation from a coasting state in which the driver's foot is off the accelerator pedal while in a lockup disengaged state.

On the other hand, the turbine rotational speed Nt, which is higher than the engine rotational speed Ne due to the rotation of the turbine by the drive wheels 8 in a coasting state up to time t1, is maintained at the same rotational speed from time t1 to time t4 due to fixing of the transmission ratio from time t1, as indicated by arrow F in FIG. 6. Accordingly, whereas the turbine rotational speed Nt>engine rotational speed Ne from time t1 to time t2, the relationship changes to engine rotational speed Ne>turbine rotational speed Nt from time t2. Then, from time t2 to time t4, due to the maintenance of the turbine rotational speed Nt, the differential rotational speed (=Ne−Nt) decreases, and the differential rotational speed (slip rotational speed) reaches a very small value at time t4, at which point the LU engagement is completed. Then, the differential rotational speed decreases from time t4 to time t5, due to the starting of the upshift control from time t4, as indicated by arrow G of FIG. 6.

In this manner, in the first embodiment, with respect to an LU engagement request and an upshift request at time t1, an LU engagement control is started from time t1, but the starting of the upshift control is delayed until time t4, at which point LU engagement is determined to be completed. Thus, whereas the engine rotational speed Ne increases due to an accelerator depression operation at time t1, the turbine rotational speed Nt will not decrease due to the upshift from time t1 being delayed. Accordingly, an increase in the differential rotational speed of the lockup clutch 3 (=Ne−Nt) is suppressed during an LU engagement control, and the time TLU that is required for the lockup engagement to be completed (time t1-time t4) becomes shorter compared to the comparative example.

Characteristic Action of the Cooperative Control

In the first embodiment, when simultaneous execution of a lockup engagement and an upshift is required due to an accelerator depression operation, the starting of the upshift control by the continuously variable transmission 6 is delayed until the LU engagement control of the lockup clutch 3 enters a lockup engagement completion region.

That is, in contrast to the engine rotational speed Ne increasing due to an accelerator depression operation, the turbine rotational speed Nt (=primary rotational speed Npri) will not decrease, because the upshifting, which is a shift that decreases the transmission input rotational speed, is delayed. Therefore, an increase in the differential rotational speed between the engine rotational speed Ne and the turbine rotational speed Nt is suppressed during an engagement control of the lockup clutch 3. Accordingly, it is possible to prevent an increase in the time that is required for the engagement of the lockup clutch 3 to be completed.

As a result, it is possible to reduce the time required for the lockup clutch 3 to complete engagement in a re-acceleration scenario in which simultaneous execution of lockup engagement and upshifting is required. With the reduction of the lockup engagement time, it is possible to suppress a deterioration in fuel consumption due to power transmission loss, compared to the case in which a non-engagement state of the lockup clutch 3 is continued.

That is, since the upshift is delayed, the shifting of the accelerator position opening amount APO, which does not take fuel consumption into consideration, from an operating point for an accelerator position opening amount of 0/8 to an operating point for an accelerator position opening amount of 1/8 will be delayed, which leads to a corresponding deterioration in fuel consumption. However, since the deterioration is minor compared to the deterioration in fuel consumption caused by an increase in the time required for the lockup engagement to be completed, the overall deterioration in fuel consumption is suppressed compared to a case in which lockup engagement and upshifting are carried out simultaneously.

In the first embodiment, the continuously variable transmission 6 carries out a shift control using the D range shift map of FIG. 2, in which the coasting shift line for an accelerator foot released state (APO=0/8) is set such that the primary rotational speed Npri is higher on the coasting shift line than on the driving shift line in a low accelerator position opening amount state (APO=1/8). That is, when sudden braking occurs from a coasting state travel, lockup disengagement will occur in time, and it is possible to prevent the engine from stalling, i.e., from ceasing to turn. However, the frequency at which an upshift request is output will increase when carrying out an accelerator depression operation from a coasting state. Therefore, it is possible to reduce the time required for the lockup clutch 3 to complete engagement when there is an accelerator depression operation from a coasting state, while preventing the engine from stalling when there is sudden braking from a coasting state.

In the first embodiment, when there is an upshift request of the continuously variable transmission 6 at the same time as an engagement request of the lockup clutch 3, due to an accelerator depression operation from a coasting state in an LU disengaged state, an LU engagement control is started. The transmission ratio of the continuously variable transmission 6 is fixed during LU engagement, and when the LU engagement is completed, an upshift control using the continuously variable transmission 6 is started. That is, when there is an accelerator depression operation in which an LU engagement request and an upshift request are output simultaneously, an LU engagement control is started immediately, and the transmission ratio of the continuously variable transmission 6 is kept fixed during LU engagement and put on standby. Thus, a constant turbine rotational speed Nt is maintained from the time of an accelerator depression operation, so that the turbine rotational speed Nt does not increase the differential rotational speed, and LU engagement is completed in a short period of time. Therefore, it is possible to reduce the time required from an accelerator operation until LU engagement is completed, in a re-acceleration scenario in which an accelerator depression operation is carried out from a coasting state while in an LU disengaged state.

The effects are described next. The effects listed below can be obtained by the control method and control device for a transmission mechanism according to the first embodiment.

(1) In a control method for a transmission mechanism (continuously variable transmission 6) provided with a torque converter 4 having a lockup clutch 3, the starting of an upshift control by the transmission mechanism (continuously variable transmission 6) is delayed until a lockup engagement control (LU engagement control) of the lockup clutch 3 enters a lockup engagement completion region, when simultaneous execution of an upshift of the transmission mechanism (continuously variable transmission 6) is required at the time of starting a lockup engagement of the lockup clutch 3 in accordance with an accelerator depression operation (FIG. 4). Thus, it is possible to provide a control method for a transmission mechanism that reduces the time required for lockup engagement to be completed, in a travel scenario in which simultaneous execution of lockup engagement and upshift is required.

(2) The transmission mechanism (continuously variable transmission 6) steplessly changes the transmission ratio, and the transmission mechanism (continuously variable transmission 6) carries out a shift control using a shift map (D range shift map of FIG. 2), in which a coasting shift line in an accelerator pedal released state (APO=0/8) is set such that a primary rotational speed Npri is higher on the coasting shift line than on a driving shift line in a low accelerator position opening amount state (APO=1/8) (FIG. 2). Accordingly, in addition to the effect of (1), it is possible to reduce the time required for the lockup clutch 3 to complete engagement when there is an accelerator depression operation from a coasting state, while preventing the engine from stalling when there is sudden braking from a coasting state.

(3) Upon determining existence of an upshift request of the transmission mechanism (continuously variable transmission 6) at the same time as an engagement request of the lockup clutch 3 due to an accelerator depression operation from a coasting state while in a lockup disengaged state (YES in S3 of FIG. 4), the lockup engagement control is started, the transmission ratio of the transmission mechanism (continuously variable transmission 6) is fixed (S5 of FIG. 4) during lockup engagement, and when the lockup engagement is completed (YES in S6 of FIG. 4), an upshift control using the transmission mechanism (continuously variable transmission 6) is started (S7 of FIG. 4). Thus, in addition to the effect of (2), it is possible to reduce the time required from an accelerator operation until lockup engagement (LU engagement) is completed, in a re-acceleration scenario in which an accelerator depression operation is carried out from a coasting state while in a lockup disengaged state (LU disengaged state).

(4) In a control device for a transmission mechanism (continuously variable transmission 6) provided with a torque converter 4 having a lockup clutch 3, a controller (CVT control unit 12) for carrying out a cooperative control between a lockup control for controlling engagement and disengagement of the lockup clutch 3 and a shift control of the transmission mechanism (continuously variable transmission 6) is provided, and the controller (CVT control unit 12) carries out a cooperative control process in which the starting of an upshift control by the transmission mechanism (continuously variable transmission 6) is delayed until a lockup engagement control (LU engagement control) of the lockup clutch 3 enters a lockup engagement completion region, when simultaneous execution of an upshift of the transmission mechanism (continuously variable transmission 6) is required at the time of starting a lockup engagement of the lockup clutch 3 in accordance with an accelerator depression operation (FIG. 4). Thus, it is possible to provide a control device for a transmission mechanism that reduces the time required for lockup engagement to be completed, in a travel scenario in which simultaneous execution of lockup engagement and upshifting is required.

(5) The transmission mechanism is a continuously variable transmission 6 that steplessly changes the transmission ratio, and when shift control of the continuously variable transmission 6 is carried out, the controller (CVT control unit 12) sets a primary rotational speed Npri, which is set to a predetermined vehicle speed at the time of an accelerator foot released state (APO=0/8), to be higher than the lowest primary rotational speed Npri, which is set to the predetermined vehicle speed at the time of accelerator depression (APO=1/8) (FIG. 2). Thus, in addition to the effect of (4), it is possible to reduce the time required for the lockup clutch 3 to complete engagement when there is an accelerator depression operation from a coasting state, while preventing the engine from stalling when there is sudden braking from a coasting state.

Second Embodiment

In contrast to the first embodiment, which is an example of a re-acceleration scenario in which an accelerator depression operation is carried out from a coasting state while in an LU disengaged state, the second embodiment is an example of a re-acceleration scenario in which an accelerator depression operation is carried out from a coasting state while in an LU engaged state.

The configuration is described first. The control method and control device according to the second embodiment are applied to an engine-equipped vehicle in which is mounted a continuously variable transmission provided with a torque converter having a lockup clutch, in the same manner as the first embodiment. The "configuration of the cooperative control process between the lockup engagement control and the upshift control" in the second embodiment will be described below. Since the "overall system configuration" of the second embodiment is the same as FIGS. 1-3 of the first embodiment, the drawings and descriptions thereof are omitted.

Figure 7:
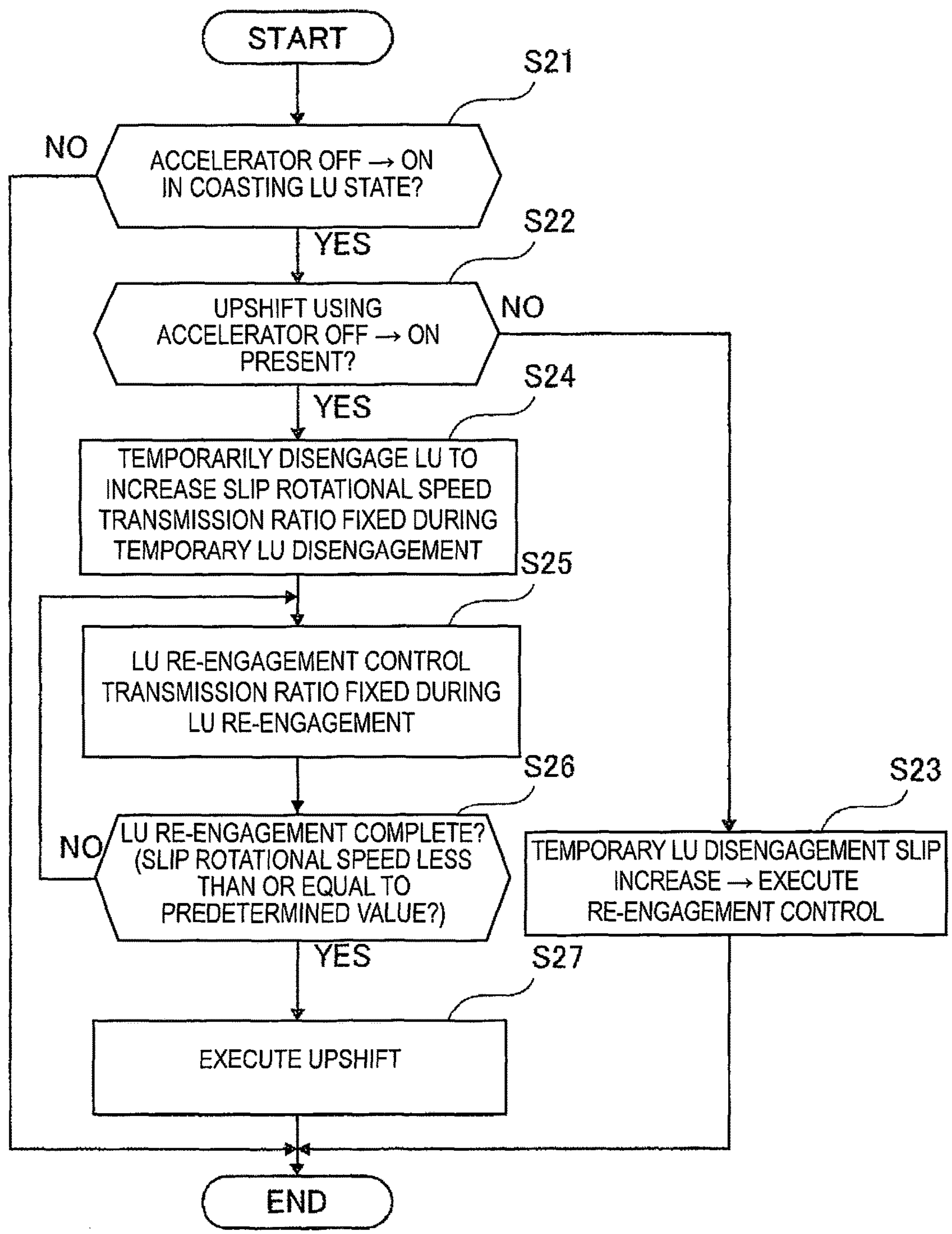
FIG. 7 is a flowchart illustrating the flow of a cooperative control process between a lockup engagement control and an upshift control, which are executed in a CVT control unit in a second embodiment, in a re-acceleration scenario that occurs due to an accelerator depression operation from a coasting state in which the driver's foot is off the accelerator pedal while in a lockup engaged state.

Configuration of the Cooperative Control Process Between the Lockup Engagement Control and the Upshift Control FIG. 7 illustrates the flow of a cooperative control process between a lockup engagement control and an upshift control, which are executed in a CVT control unit 12 of the second embodiment, in a re-acceleration scenario that occurs due to an accelerator depression operation from a coasting state while the driver's foot is off the accelerator pedal while in an LU engaged state. Each step in FIG. 7 representing the configuration of the cooperative control process between the lockup engagement control and the upshift control will be described below. This process is started when the lockup clutch 3 is in an engaged state due to an establishment of the coast lockup condition in a coasting state with the driver's foot off the accelerator pedal, and the lockup ON condition and the accelerator OFF condition are both satisfied.

In Step S21, it is determined whether or not an accelerator depression operation has been carried out with the intention of re-accelerating while in a coasting LU state. If YES (accelerator OFF→ON in a coasting LU state), the process proceeds to Step S22, and if NO (other than accelerator OFF→ON in a coasting LU state), the process proceeds to END. That is, in Step S21, YES is determined if an accelerator depression operation is carried out from a coasting LU state with the driver's foot off the accelerator pedal, in which the accelerator position opening amount APO is an opening amount of 0/8 and the lockup clutch 3 is engaged.

In Step S22, following the determination of accelerator OFF→ON in a coasting LU state in Step S21, it is determined whether or not there is an upshift request due to an accelerator depression operation from a state in which the foot is away from the accelerator. If YES (upshift request due to accelerator OFF→ON present), the process proceeds to Step S24, and if NO (downshift request due to accelerator OFF→ON present), the process proceeds to Step S23.

In Step S23, following the determination that a downshift request due to accelerator OFF→ON is present in Step S22, the lockup clutch 3 is temporarily disengaged to increase the slip rotational speed (clutch differential rotational speed), after which an LU re-engagement control is carried out. A downshift control of the continuously variable transmission 6 is started in accordance with a downshift request at the same time that a temporary LU disengagement is started, and the process proceeds to END.

Here, the reason for executing the temporary LU disengagement as well as the LU re-engagement simultaneously with the downshift is the same as that in the first embodiment. That is, if a downshift control of the continuously variable transmission 6 is carried out, the primary rotational speed Npri, which is the transmission rotational input speed, increases, the differential rotational speed of the torque converter 4 decreases due to a downshift control being carried out, and it becomes possible to complete the re-engagement of the lockup clutch 3 (Ne=Nt) in a short period of time.

In Step S24, following the determination that an upshift request due to accelerator OFF→ON is present in Step S22, the lockup clutch 3 is temporarily disengaged to increase the slip rotational speed (clutch differential rotational speed), but the transmission ratio of the continuously variable transmission 6 is kept fixed during the temporary LU disengagement, and the process proceeds to Step S25.

Here, the "temporary LU disengagement" is carried out by lowering the LU command pressure to zero command pressure in a stepwise manner, and then raising the LU command pressure to an initial command pressure after a short, predetermined period of time has elapsed. The reason for temporarily disengaging the lockup clutch 3 will now be explained: at the time of an accelerator depression operation, the lockup clutch 3 is engaged. Consequently, if the clutch engagement is maintained without change, a highly fluctuating engine torque, which is due to a fuel injection using an accelerator depression operation after a fuel cut, is transmitted via the lockup clutch 3. Therefore, it is necessary to absorb the shock using the converter by temporarily disengaging the engaged lockup clutch 3, in order to avoid the occurrence of shock caused by the fluctuating torque being transmitted to the drive wheels. The reason for this temporary LU disengagement is the same in Step S23.

In Step S25, following an increase in the slip rotational speed due to the temporary LU disengagement in Step S24, or, the determination that LU re-engagement is incomplete in Step S26, an LU re-engagement control is carried out following the temporary disengagement of the lockup clutch 3, but the transmission ratio of the continuously variable transmission 6 is held fixed during the LU re-engagement, and the process proceeds to Step S26.

Here, "execution of an LU re-engagement control" is carried out by raising the LU command pressure to the initial command pressure, and then increasing the pressure from the initial command pressure by using a ramp command pressure which has a predetermined ramp gradient angle. "Fixing the transmission ratio of the continuously variable transmission 6" is realized by delaying the control start timing so as to delay the starting of the upshift control during the temporary LU disengagement and the LU re-engagement, when an upshift request is output.

In Step S26, following the LU re-engagement control and the fixing of the transmission ratio in Step S25, it is determined whether or not the LU re-engagement has been completed. If YES (LU re-engagement complete), the process proceeds to Step S27, and if NO (LU re-engagement incomplete), the process returns to Step S25.

Here, the "determination of completion of LU re-engagement" is made when the slip rotational speed, which is the differential rotational speed of the lockup clutch 3 (=engine rotational speed Ne−turbine rotational speed Nt) becomes less than or equal to a predetermined value (for example, an engagement completion threshold of about 10 rpm). When it is determined that LU re-engagement is complete, the LU command pressure is raised to a complete engagement command pressure.

In Step S27, following the determination that LU re-engagement is complete in Step S26, an upshift control of the continuously variable transmission 6, the transmission ratio of which was fixed, is started to carry out an upshift corresponding to the upshift request, and the process proceeds to END.

The actions are described next. The "action of the cooperative control process between the lockup engagement control and the upshift control," the "action of the cooperative control in a re-acceleration scenario from an LU engaged state," and the "characteristic action in the cooperative control" will be described separately, regarding the control actions of the transmission mechanism of the second embodiment.

Action of the Cooperative Control Process Between the Lockup Engagement Control and the Upshift Control The target scenario of the cooperative control process in the second embodiment is the following re-acceleration scenario. (c) It is a re-acceleration scenario in which an LU re-engagement request is output following the temporary LU disengagement due to an accelerator depression operation (0/8 opening amount→1/8 opening amount) being carried out from a coasting state while the lockup clutch 3 is in an engaged state by using a coast lockup control.

In a re-acceleration scenario, in which an accelerator depression operation is carried out where the accelerator position opening amount APO is not 1/8, but is an opening amount greater than or equal to 2/8, the process proceeds from Step S21→Step S22→Step S23→END in the flowchart of FIG. 7. That is, in Step S22, it is determined that a downshift request by accelerator OFF→ON is present. In the subsequent Step S23, the lockup clutch 3 is temporarily disengaged to increase the slip rotational speed, after which an LU re-engagement control is carried out. A downshift control of the continuously variable transmission 6 is started in accordance with a downshift request at the same time that the LU disengagement is started.

For the re-acceleration scenario (c), if an accelerator depression operation is carried out in which the accelerator position opening amount APO is up to 1/8, the process proceeds from Step S21→Step S22→Step S24→Step S25→Step S26 in the flowchart of FIG. 7. That is, in Step S22, it is determined whether an upshift request by accelerator OFF→ON is present. In the subsequent Step S24, the lockup clutch 3 is temporarily disengaged while keeping the transmission ratio of the continuously variable transmission 6 fixed, to increase the slip rotational speed (clutch differential rotational speed). In the subsequent Step S25, an LU re-engagement control is carried out while keeping the transmission ratio of the continuously variable transmission 6 fixed. Then, during the determination in Step S26 that LU re-engagement is incomplete, the flow from Step S25→Step S26 is repeated. Thereafter, if it is determined that LU re-engagement is complete in Step S26, the process proceeds from Step S26 to Step S27→END. That is, in Step S27, when it is determined that LU re-engagement is complete, an upshift control of the continuously variable transmission 6, the transmission ratio of which was fixed, is started to carry out an upshift corresponding to the upshift request.

In this manner, in a re-acceleration scenario in which is carried out, from a coasting LU state, an accelerator depression operation in which the accelerator position opening amount APO is greater than or equal to an opening amount of 2/8, when a downshift request is output, a temporary LU disengagement as well as an LU re-engagement control and a downshift control are carried out simultaneously by using independent control. On the other hand, in the re-acceleration scenario (c) in which is carried out, from a coasting LU state, an accelerator depression operation in which the accelerator position opening amount APO is up to an opening amount of 1/8, when an upshift request is output, the start timing of the upshift control is delayed by using cooperative control.

Action of the Cooperative Control in a Re-Acceleration Scenario from an LU Engaged State A comparative example is assumed in which, when there is an upshift request of the continuously variable transmission due to an accelerator depression operation from a coasting state while in an LU engaged state, an upshift control and an LU re-engagement control from a temporary LU disengagement are independently controlled. The action of the independent control in the comparative example will be described below, on the basis of the time chart shown in FIG. 8.

When an accelerator depression operation from an opening amount of 0/8 to 1/8 is carried out at time t1, a temporary LU disengagement control and an upshift control are started simultaneously from time t1 in accordance with a temporary LU disengagement request and an upshift request due to the accelerator depression. Thus, the engine rotational speed Ne, which is the idling rotational speed in a coasting state up to time t1, rises from time t1 to time t3 in accordance with the accelerator depression operation. The engine rotational speed Ne from time t3 to time t4 then decreases when a clutch load is applied, due to the LU capacity increasing until time t4 due to the LU re-engagement control of the lockup clutch 3.

Figure 8:
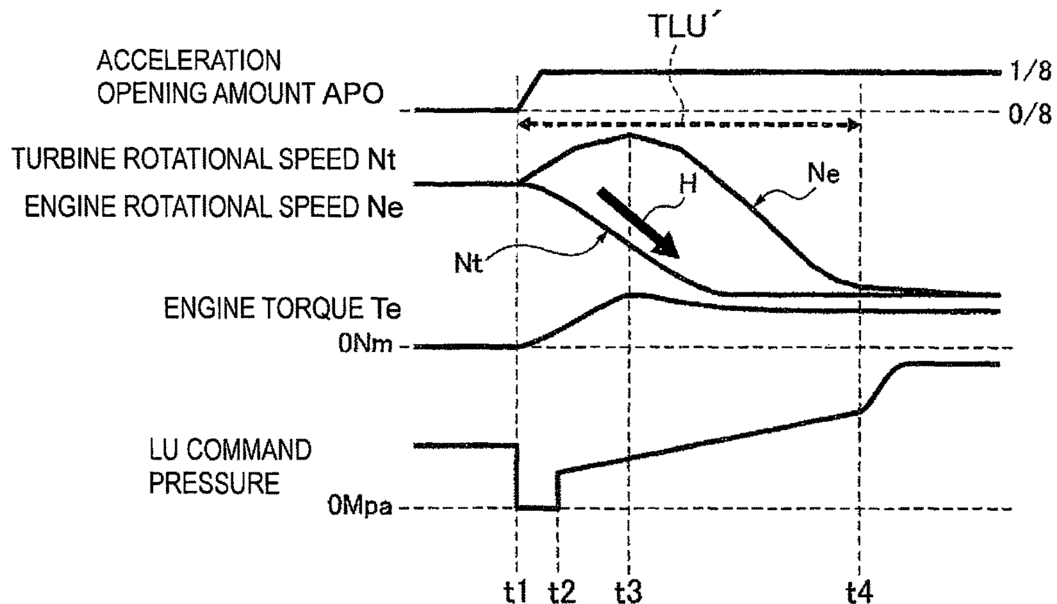
FIG. 8 is a time chart illustrating the respective characteristics of the accelerator position opening amount APO/engine rotational speed Ne/turbine rotational speed Nt/engine torque Te/LU command pressure, when independent control in a comparative example is executed in a re-acceleration scenario that occurs due to an accelerator depression operation from a coasting state in which the driver's foot is off the accelerator pedal while in a lockup engaged state.

On the other hand, the turbine rotational speed Nt, which is the same as the engine rotational speed Ne, due to the vehicle being in an LU engaged state up to time t1, decreases from time t1 to time t4, due to the starting of the upshift control from time t1, as indicated by arrow H in FIG. 8. Consequently, the differential rotational speed (=Ne−Nt) increases from time t1 to time t3, in accordance with the relationship between the increasing engine rotational speed Ne and the decreasing turbine rotational speed Nt. From time t3 to time t4, the differential rotational speed decreases, and the differential rotational speed (slip rotational speed) reaches a very small value at time t4, at which point LU engagement is complete.

In this manner, in the comparative example, an LU engagement control and an upshift control are started simultaneously in accordance with an LU engagement request and an upshift request at time t1. Thus, in contrast to the engine rotational speed Ne increasing due to an accelerator depression operation at time t1, the turbine rotational speed Nt decreases due to an upshift control from time t1. Consequently, the differential rotational speed of the lockup clutch (=Ne−Nt) increases during the LU engagement control, and it becomes necessary to wait until time t4, at which point the differential rotational speed becomes small; therefore, the time TLU' that is required for the lockup engagement to be completed (time t1-time t4) is relatively long.

In contrast, in the second embodiment, when there is an upshift request of the continuously variable transmission 6 due to an accelerator depression operation from a coasting state while in an LU engaged state, an upshift control and an LU re-engagement control from a temporary LU disengagement are cooperatively controlled. The action of the cooperative control in the second embodiment will be described below, on the basis of the time chart shown in FIG. 9.

When an accelerator depression operation from an opening amount of 0/8 to 1/8 is carried out at time t1, with respect to a temporary LU disengagement request and an upshift request at time t1, a temporary LU disengagement control and an LU re-engagement control are started from time t1, but the starting of the upshift control is delayed until time t4, at which point the LU re-engagement is determined to be completed. Thus, the engine rotational speed Ne, which is the idling rotational speed in a coasting state up to time t1, rises from time t1 to time t3 in accordance with the accelerator depression operation. Then, the engine rotational speed Ne from time t3 decreases toward time t4 by receiving a clutch load, due to the LU capacity increasing due to the LU engagement control of the lockup clutch 3.

Figure 9:
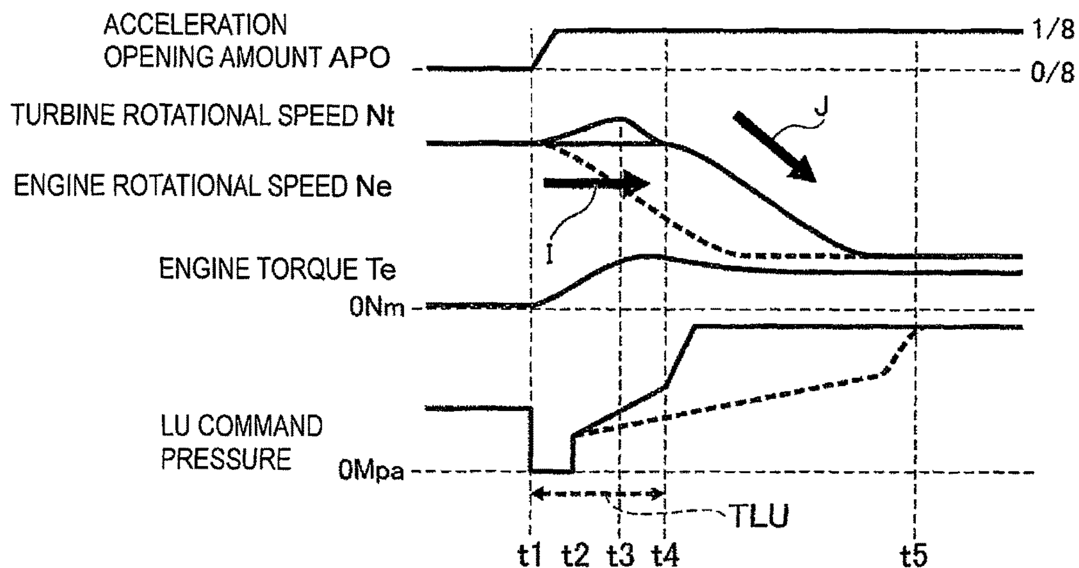
FIG. 9 is a time chart illustrating the respective characteristics of the accelerator position opening amount APO/engine rotational speed Ne/turbine rotational speed Nt/engine torque Te/LU command pressure, when cooperative control of the second embodiment is executed in a re-acceleration scenario that occurs due to an accelerator depression operation from a coasting state in which the driver's foot is off the accelerator pedal while in a lockup engaged state.

On the other hand, the turbine rotational speed Nt, which is the same rotational speed as the engine rotational speed Ne, due to being in an LU engaged state up to time t1, is maintained at the same rotational speed from time t1 to time t4, due to the fixing of the transmission ratio from time t1, as indicated by arrow I in FIG. 9. Thus, although the engine rotational speed Ne exceeds the turbine rotational speed Nt from time t1 to time t3, from time t3, due to the maintenance of the turbine rotational speed Nt, the differential rotational speed (=Ne−Nt) decreases toward time t4, and the differential rotational speed (slip rotational speed) reaches a very small value at time t4, at which point the LU re-engagement is completed. Then, the differential rotational speed decreases from time t4 to time t5, due to the starting of the upshift control from time t4, as indicated by arrow J of FIG. 9.

In this manner, in the second embodiment, with respect to a temporary LU disengagement request and an upshift request at time t1, a temporary LU disengagement control and an LU re-engagement control are started from time t1, but the starting of the upshift control is delayed until time t4, at which point the LU re-engagement is determined to be complete. Thus, in contrast to the engine rotational speed Ne increasing due to an accelerator depression operation at time t1, the turbine rotational speed Nt will not decrease due to the upshift from time t1 being delayed. Thus, an increase in the differential rotational speed of the lockup clutch 3 (=Ne−Nt) is suppressed during an LU re-engagement control, and the time TLU that is required for the lockup engagement to be completed (time t1-time t4) becomes shorter compared to the comparative example.

Characteristic Action of the Cooperative Control

In the second embodiment, when there is an upshift request of the continuously variable transmission 6 due to an accelerator depression operation from a coasting state with the driver's foot off the accelerator pedal in an LU engaged state, an LU re-engagement control is carried out following the start of the temporary disengagement of the lockup clutch 3. The transmission ratio of the continuously variable transmission 6 is fixed during the temporary LU disengagement and the LU re-engagement, and when the LU re-engagement is completed, an upshift control using the continuously variable transmission 6 is started. That is, when there is an accelerator depression operation in which an upshift request is output in an LU engaged state, a temporary LU disengagement control is started immediately, and then an LU re-engagement control is carried out. Then, the transmission ratio of the continuously variable transmission 6 is kept fixed during the temporary LU disengagement and the LU engagement and put on standby. The shock at the time of an accelerator depression is avoided by using this temporary LU disengagement. In addition, during the temporary LU disengagement and the LU re-engagement, the turbine rotational speed Nt is maintained unchanged from the time of the accelerator depression operation, so that the turbine rotational speed Nt does not increase the differential rotational speed, and LU re-engagement is completed in a short period of time. Therefore, it is possible to reduce the time required from an accelerator operation until LU re-engagement is completed while avoiding shock at the time of the accelerator depression operation, in a re-acceleration scenario in which an accelerator depression operation is carried out from a coasting state while in an LU engaged state.

The effects are described next. In addition to the effects of (1), (2), (4), and (5) of the first embodiment, the effects listed below can be obtained by the control method and control device for a transmission mechanism according to the second embodiment.

(6) Upon determining existence of an upshift request of the continuously variable transmission 6 due to an accelerator depression operation from a coasting state with the driver's foot off the accelerator pedal while in a lockup engaged state (LU engaged state) (YES in S22 of FIG. 7), a lockup re-engagement control (LU re-engagement control) is carried out following the starting of a temporary disengagement of the lockup clutch 3, the transmission ratio of the continuously variable transmission 6 is fixed during the temporary disengagement of the lockup (during temporary LU disengagement) and during re-engagement of lockup (during LU re-engagement) (S24 and S25 of FIG. 7), and, when the lockup re-engagement (LU re-engagement) is completed (YES in S26 of FIG. 7), an upshift control using the continuously variable transmission 6 is started (S27 of FIG. 7). Thus, it is possible to reduce the time required from an accelerator operation until the lockup re-engagement (LU re-engagement) is completed while avoiding shock at the time of the accelerator depression operation, in a re-acceleration scenario in which an accelerator depression operation is carried out from a coasting state while in a lockup engaged state (LU engaged state).

The control method and control device for a transmission mechanism according to the present invention were described above on the basis of the first embodiment and the second embodiment, but specific configurations thereof are not limited to these embodiments, and various modifications and additions to the design can be made without departing from the scope of the invention according to each claim in the Claims.

In the first embodiment, an example was shown in which an upshift control is started when the lockup engagement is determined to be complete, and in the second embodiment, an example was shown in which an upshift control is started when the lockup re-engagement is determined to be complete. However, the configuration may be such that an upshift control is started when in an engagement completion region that is immediately before the completion of the lockup engagement or the completion of the lockup re-engagement is determined. That is, even if an upshift control is started when it is determined that the engagement is completed, there may be hydraulic response delays, etc., before the upshift, in which the actual transmission ratio changes with respect to the upshift command value, can take place. Therefore, the configuration may be such that hydraulic response delay times are predicted, and an upshift control is started at a timing that precedes the engagement completion time by an amount of time equal to the hydraulic response delay time.

In the first embodiment, an example of a re-acceleration scenario was shown in which, when there is an upshift request of the continuously variable transmission 6 at the same time as an engagement request of the lockup clutch 3, due to an accelerator depression operation from a coasting state while in an LU disengaged state, a lockup engagement control is started. In addition, in the second embodiment, an example of a re-acceleration scenario was shown in which, when there is an upshift request of the continuously variable transmission 6 due to an accelerator depression operation from a coasting state with the driver's foot off the accelerator pedal while in an LU engaged state, an LU re-engagement control is carried out following the start of the temporary disengagement of the lockup clutch 3. However, the invention can be applied to a starting scenario in a vehicle that employs a start slip control, in which there is an upshift request of a continuously variable transmission at the same time as an engagement request of a lockup clutch due to an accelerator depression operation while in an LU disengaged state.

In the first and second embodiments, examples of a continuously variable transmission 6 were shown in which the transmission ratio is changed in a stepless manner to serve as the transmission mechanism. However, the transmission mechanism may be a stepped transmission in which a plurality of gear shift stages is changed. That is, even in a stepped transmission, the transmission input rotational speed (=turbine rotational speed) decreases during an inertia phase of an upshift.

In the first and second embodiments, examples were shown in which a shift control is carried out using the D range shift map of FIG. 2, in which the coasting shift line in an accelerator foot released state (APO=0/8) is set such that the primary rotational speed Npri is higher on the coasting shift line than on the driving shift line in a low accelerator position opening amount state (APO=1/8). However, a shift control may be carried out using a shift map in which the coasting shift line is set such that a primary rotational speed Npri is lower on the coasting shift line than on a driving shift line in a low accelerator position opening amount state (APO=1/8). For example, it may be applied to a case in which, when in a coasting acceleration state on a downhill slope in which the lockup clutch is disengaged, the vehicle speed increases further in response to an accelerator depression operation, and an upshift request is output.

In the first and second embodiments, examples were shown in which the control method and control device for a transmission mechanism according to the present invention are applied to an engine-equipped vehicle comprising a continuously variable transmission provided with a torque converter having a lockup clutch. However, the control method and control device according to the present invention can be applied to a hybrid vehicle with an engine and a motor as drive sources, or to an electric automobile with a motor as the drive source. In short, the control method and control device can be applied to any vehicle provided with a transmission mechanism comprising a torque converter with a lockup clutch.

The invention claimed is:

1. A control method for a transmission mechanism provided with a torque converter having a lockup clutch, the control method comprising:

delaying starting of an upshift control by the transmission mechanism until after a lockup engagement of the lockup clutch in a lockup engagement control is completed, when simultaneous execution of an upshift of the transmission mechanism is required at a time of starting the lockup engagement of the lockup clutch.

2. The control method according to claim 1, wherein the transmission mechanism steplessly changes the transmission ratio, and further comprising carrying out a shift control of the transmission mechanism using a shift map in which a coasting shift line in a state in which a driver's foot is off an accelerator pedal is set to have a higher a primary rotational speed than that of a driving shift line in a low accelerator position opening amount state.

3. The control method according to claim 2, further comprising starting the lockup engagement control upon determining existence of an upshift request of the transmission mechanism at the same time as an engagement request of the lockup clutch due to an accelerator depression operation from a coasting state with the driver's foot off the accelerator pedal while in the lockup disengaged state, fixing the transmission ratio of the transmission mechanism during the lockup engagement, and starting an upshift control using the transmission mechanism is started when the lockup engagement is completed.

4. The control method according to claim 2, further comprising carrying out a lockup re-engagement control following starting of a temporary disengagement of the lockup clutch upon determining existence of an upshift request of the transmission mechanism due to an accelerator depression operation from a coasting state with the driver's foot off the accelerator pedal while in a lockup engaged state, fixing the transmission ratio of the transmission mechanism during the temporary disengagement of the lockup and during re-engagement of lockup, and starting an upshift control using the transmission mechanism when the lockup re-engagement is completed.

5. A control device for a transmission mechanism provided with a torque converter having a lockup clutch, the control device comprising:

a controller programmed to perform a cooperative control between a lockup control for controlling engagement and disengagement of the lockup clutch and a shift control of the transmission mechanism, the controller being further programmed to perform a cooperative control in which starting of an upshift control by the transmission mechanism is delayed until after a lockup engagement of the lockup clutch in a lockup engagement control is completed, when simultaneous execution of an upshift of the transmission mechanism is required at a time of starting the lockup engagement of the lockup clutch.

6. The control device according to claim 5, wherein the transmission mechanism is a continuously variable transmission that steplessly changes the transmission ratio, and the controller is further programmed to set a primary rotational speed to a predetermined vehicle speed at a time of an accelerator pedal released state to be higher than a lowest primary rotational speed that is set to a predetermined vehicle speed at a time of accelerator depression when carrying out shift control of the continuously variable transmission.

* * * * *